(12) United States Patent
Nakazawa et al.

(10) Patent No.: US 6,305,787 B1
(45) Date of Patent: Oct. 23, 2001

(54) INK JET RECORDING METHOD

(75) Inventors: Yusuke Nakazawa; Kazuo Ishii; Eiichi Kato, all of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/419,393

(22) Filed: Oct. 15, 1999

(30) Foreign Application Priority Data

Oct. 16, 1998 (JP) .................................................. 10-295611

(51) Int. Cl.[7] .................................. B41J 2/14; B41J 2/16; B41J 2/06
(52) U.S. Cl. .................................................................. 347/51
(58) Field of Search .................................. 347/51, 36, 22, 347/55, 89, 100

(56) References Cited

U.S. PATENT DOCUMENTS 3,575,841 * 4/1971 Harris ................................... 204/643
5,975,680 * 11/1999 Wen et al. ............................. 347/43

FOREIGN PATENT DOCUMENTS

| 49-62024 | 6/1974 | (JP) . |
| 56-4467 | 1/1981 | (JP) . |
| 56-9429 | 3/1981 | (JP) . |
| 61-59911 | 12/1986 | (JP) . |
| WO9311866 | 6/1993 | (WO) . |

* cited by examiner

*Primary Examiner*—Thinh Nguyen
(74) *Attorney, Agent, or Firm*—Reed Smith LLP

(57) ABSTRACT

An ink jet recording method comprising: supplying insulating oily ink to an ejection part disposed so as to face a recording medium; irradiating the ink at the ejection part with light; applying an electrostatic field to the ink at the ejection part under irradiation in accordance with image data so as to eject the ink to form an image on the recording medium; and recovering excess ink from the ejection part. Also disclosed is an ink jet recording apparatus suitable for the ink jet recording method.

7 Claims, 3 Drawing Sheets

INK JET RECORDING METHOD

FIELD OF THE INVENTION

This invention relates to an ink jet recording method for forming a high quality image which is applicable to printers, LCD color filter manufacturing machines, textile printing machines, printing plate making machines, and the like. More particularly, it relates to a novel ink jet recording method in which ejection of an insulating oily ink is controlled by an electrostatic field under irradiation with light.

BACKGROUND OF THE INVENTION

An image recording apparatus in which small droplets of liquid ink are ejected onto a recording medium to form a dot image has been put to practical use as an ink jet printer. The ink jet printer is attracting attention as a recording means on plain paper for its advantages over other recording means, such as low noise, compactness, and no necessity of development and fixing. Of various ink jet printing systems so far invented, typical are a system comprising ejecting ink droplets under pressure of vapors generated by heat of a heating element (see, for example, JP-B-56-9429 and JP-B-61-59911 (The term "JP-B" used herein means an "unexamined Japanese patent publication")) and a system comprising ejecting ink droplets by mechanical pulsated pressure generated by a piezoelectric element.

Recording heads practically used in these ink jet printers include a serial scanning type head which is mounted on a carriage and moves in a direction (main scanning direction) perpendicular to the moving direction of recording paper (secondary scanning direction). Because it is difficult to increase the recording speed with this serial scanning type head, a so-called line scanning type head is conceivable, which is as wide as recording paper to achieve an increased recording speed. However, it is not easy to realize such a line scanning type head for the following reasons.

An ink jet recording system essentially suffers from local concentration of ink due to evaporation or volatilization of the solvent, which is apt to cause clogging of individual fine nozzles in conformity to resolving power. Further, the system utilizing pressure of vapors to create an ink jet involves adhesion of insoluble matter due to thermal or chemical reactions between the vapors and the ink, and the system using pressure generated by a piezoelectric element has a complicated structure for ink passage that may boost the likelihood of clogging. A line scanning type head requires several thousands of nozzles, much more than several tens to a hundred and several tens of nozzles as required in a serial scanning type head. Therefore, clogging occurs with fairly high frequency in the line scanning type head to reduce reliability seriously.

Another problem associated with conventional ink jet recording apparatus is inadequacy for improvement of resolving power. That is, the system using the pressure of vapors has difficulty in forming ink droplets of 20 μm or smaller in diameter. Since ink droplets unavoidably feather on a recording medium, it is difficult for ink droplets greater than 20 μm to form dots of about 50 μm or smaller in diameter. On the other hand, because the recording head used in the system utilizing the pressure generated from a piezoelectric element has a complicated structure, there is difficulty of processing in making a head of high resolving power.

In order to overcome these disadvantages, an ink jet recording method involving use of electrostatic force has been proposed, in which a voltage is applied to an array of thin film electrodes to eject ink or a colorant component thereof from the ink liquid surface. Included in this method are a system comprising ejecting ink by electrostatic attraction force (see JP-A-49-62024 and JP-A-56-4467 (The term "JP-A" used herein means an "unexamined published Japanese patent application")) and a system comprising ejecting ink containing charged colorant particles in an increased concentration (see WO93/11866: PCT/AU92/00665).

In these systems a slit nozzle head that does not require a nozzle for every dot or a nozzleless head that does not require a partition for making up an ink channel for every dot is used. Therefore, the systems are effective in preventing or treating clogging that has been a great bar to realization of a line scanning type recording head. According to the latter system, in particular, ink droplets of very small diameter can be formed and ejected stably, and it is colorant particles in ink that is mainly ejected so that the printed material suffers little feathering. The latter system is therefore promising for achieving high resolving power. Conventional ink jet recording apparatus using the system of ejecting colorant particles by electrostatic force comprise, as stated above, a recording head having an array of electrodes, on each of which a high voltage of several hundreds to several thousands of volts is applied to eject ink.

However, in case where such an electrode array is applied to a multi-nozzle head having a plurality of ink ejection nozzles like a line scanning type head, electric field interference between adjacent electrodes gives rise to a problem when a high voltage is fed to the electrodes. Further, the voltage signals for ink ejection are generally sent by on-off control of the output voltage from a high-voltage power source by means of a drive. Where the applied voltage is high, it is necessary to use a high-voltage resistant drive, which increases the price of the apparatus. Although this problem could be solved by reducing the distance between the head and a recording medium to lower the applied voltage, such will make image formation instable, because the printing performance is liable to undergo the influences of the thickness of recording medium, paper dust, or dust in air.

SUMMARY OF THE INVENTION

An object of the invention is to provide an electrostatic type ink jet system which exhibits high resolving power without feathering, operates stably, and is inexpensive and whose line scanning type head is easy to make. More specifically, the object is to reduce the signal voltage for cost reduction and stable operation in an ink jet recording system in which ink containing charged colorant particles is ejected in an increased concentration.

Other objects and effects of the present invention will become apparent from the following description.

The inventor studied, from various aspects, on ink for ink jet recording and an ink jet recording method suitable for the ink. As a result, it has been found that the objects of the invention can be accomplished by the following ink jet recording methods:

(1) An ink jet recording method comprising:
    supplying insulating oily ink to an ejection part disposed so as to face a recording medium;
    irradiating the ink at said ejection part with light;
    applying an electrostatic field to the ink at said ejection part under irradiation in accordance with image data so as to eject the ink to form an image on the recording medium; and
    recovering excess ink from said ejection part.

(2) The ink jet recording method according to the above (1), wherein said insulating oily ink comprises:
   a nonaqueous solvent having a specific electric resistance of not lower than $10^9$ Ωcm and a specific dielectric constant of not higher than 3.5; and
   a dispersoid dispersed in said nonaqueous solvent, which comprises at least colored particles that are solid at ordinary room temperature.

(3) The ink jet recording method according to the above (1) or (2), wherein said irradiating light involves a wavelength that is absorbed by said ink.

According to the ink jet recording method of the present invention, an ink dot image can be formed with high resolving power, without suffering ink feathering, in a stable manner and at a low cost. The invention enables easy making of a line scanning type head, which realizes high-speed recording.

DETAILED DESCRIPTION OF THE INVENTION

An apparatus for use in practicing the ink jet recording method of the present invention is described below with reference to the specific embodiments shown in the accompanying drawings, but the invention is not deemed to be limited thereto.

Figure 1:
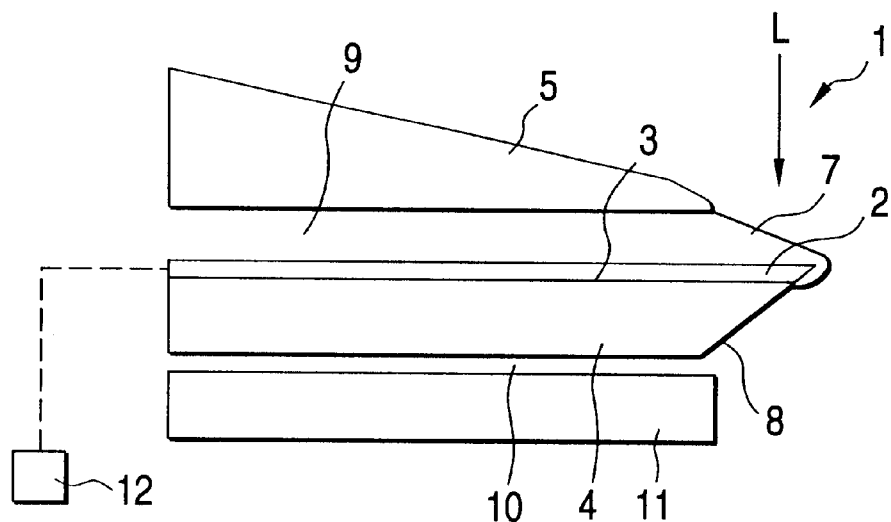
FIG. 1 is a schematic cross sectional view of an embodiment of a head for use in the invention.
Figure 2:
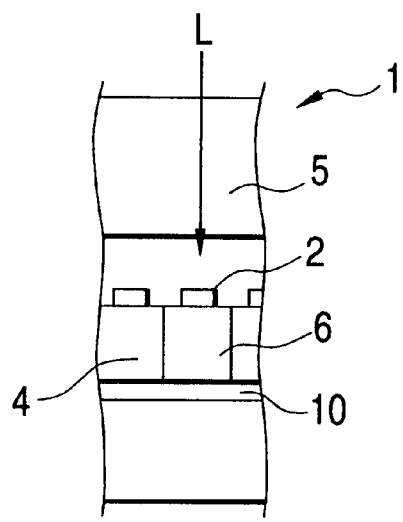
FIG. 2 is a schematic front view of the head shown in FIG. 1.

FIGS. 1 and 2 schematically depict a partial cross sectional view and a partial front view, respectively, of an embodiment of the recording head useful in the invention. These Figs. show only the main part of the head in the vicinity of an ink ejection part. A recording head 1 shown in FIGS. 1 and 2 has a tapered first insulating base 5 which is paired with a second insulating base 4 with a space therebetween. The tip of the second insulating base 4 is tapered to form a slant 8. The first and second insulating bases 5 and 4 can be made of plastics, glass, ceramics, and the like.

The upper side 3 of the second insulating base 4 which forms an acute angle with the slant 8 has provided thereon a plurality of electrodes 2 that independently serve as ejection electrodes functioning as an electrostatic field generator at ejection parts. Each ejection electrode 2 extends to the close vicinity of the tip of the upper side 3, and the tip of the ejection electrode 2 projects forward from the first insulting base 5 to constitute the ejection part. In between the first and second insulating bases 5 and 4 is formed an ink channel 9 as means for supplying ink 7 to the ejection part. An ink return channel 10 is formed beneath the second insulating base 4 as means for recovering excess ink.

The ejection electrodes 2 can be provided by well-known techniques such as photolithography. For example, an electrically conductive material, such as aluminum, nickel, chromium, gold or platinum, is deposited on the second insulating base 4 by vacuum evaporation, sputtering or electroless plating. A photoresist is applied thereon, exposed to light through a mask having a prescribed pattern of electrodes, and developed to form a photoresist pattern. The thus exposed conductive material layer is then removed by etching and/or mechanical stripping. The electrodes 2 are electrically independent from each other.

The first and second insulating bases 5 and 4 are positioned to face each other with a space therebetween and with the tips of the ejection electrodes 2 projecting over the tip of the first insulating base 5 preferably by 2 mm or less. If the ejection electrodes 2 project too much, the ink meniscus fails to reach the tip of the ejection part, resulting in unsatisfactory ejection or reduction of recording frequency. The space between the first and the second insulating bases 5 and 4 is preferably from 0.1 to 3 mm. In case that the space is too narrow, the ink is hardly supplied or hardly ejected, or the recording frequency reduces. If it is too wide, the meniscus is unstable, making ink ejection unstable.

The ejection electrodes 2 are connected to a signal power source 12. In carrying out recording, ink 7 on the ejection electrodes being irradiated with light L, an ejection voltage from the signal power source 12 is applied to the ejection electrode based on image data. By the application of the ejection voltage, the ink is ejected onto a recording medium (not shown) that is facing the ejection part. Irradiating is performed with light from an irradiating means (not shown) which generally involves a wavelength that is absorbed by the ink used. Exposure units generally employed in electrophotography or printing plate making, such as a laser, an LED, a plasma light emission array, a halogen lamp, a xenon lamp, and a fluorescent lamp, can be used as a means for irradiation. The wavelength of the irradiating light is selected in conformity with the absorption wavelengths of the ink used.

The ink channel 9 connects with an ink feeder (not shown) at the rear. A backing plate 11 is provided on the lower side of the second insulating base 4 with a space therebetween, forming an ink return channel 10. Desirably, the space for ink return is 0.1 mm or more. If the space is too narrow, the ink hardly returns, tending to cause an ink leakage. The ink return channel 10 connects with an ink suction means not shown.

Where a uniform ink flow on the ejection part is desired, a plurality of grooves 6 may be provided on the slant 8, i.e., between the ejection part and the ink return channel 10 shown in FIG. 2. The ink is led from the tip of ejection electrodes 2 to the ink return channel 10 through the grooves 6 by capillarity. Each groove 6 sucks a given amount of the ink around the tip of the ejection electrode by capillarity which depends on the width of the groove 6, thus having a function of forming an ink flow with a given liquid thickness around the tip of the ejection electrode. Each groove 6 is designed to exert capillarity, preferably having a width of 10 to 200 $\mu$m and a depth of 10 to 300 $\mu$m. A requisite number of grooves 6 are provided so as to form a uniform ink flow over the total length of the head.

The tip of the ejection electrode 2 is desirably as narrow as possible to achieve high definition image formation as demanded, for example, in printing of letters. The width of the tip, while subject to variation depending on conditions, etc., usually ranges from 5 to 100 $\mu$m.

Figure 3:
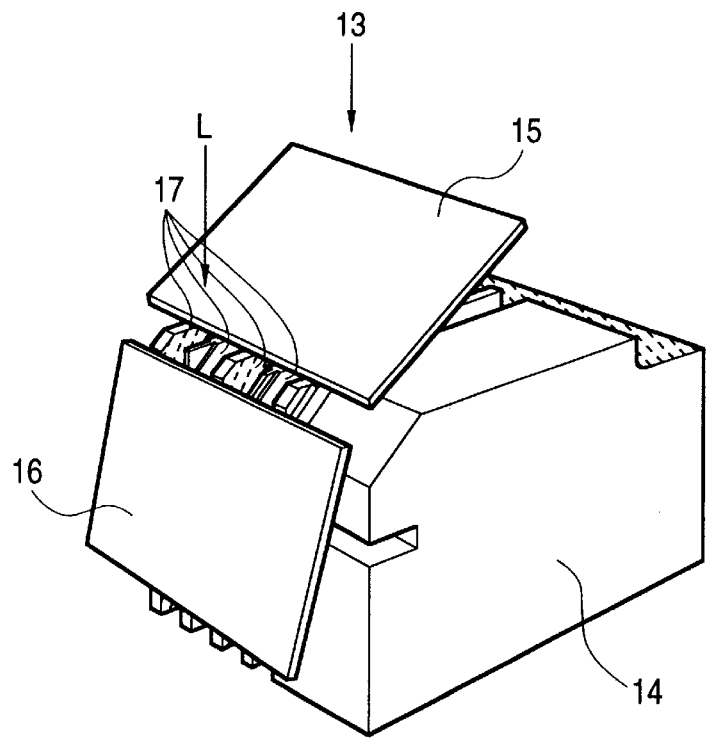
FIG. 3 is a schematic perspective view of another embodiment of a head for use in the invention.
Figure 4:
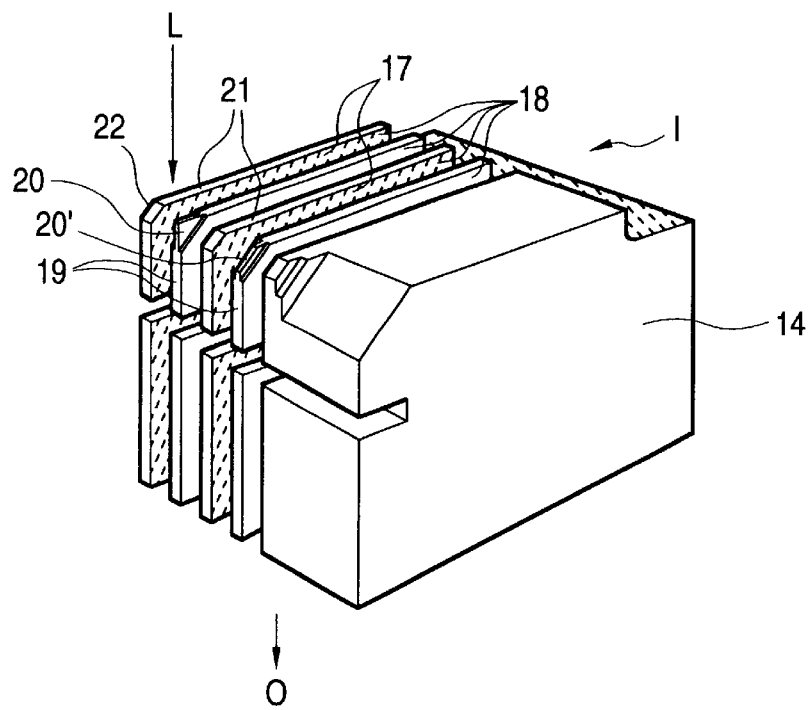
FIG. 4 is a schematic perspective view of the main body of the head shown in FIG. 3.

Another embodiment of the head for carrying out the recording method of the invention is shown in FIGS. 3 and 4. In FIG. 3 is displayed a part of a recording head 13 for illustration. The head 13 comprises a main body 14 made of an insulating material, such as plastics, ceramics or glass, and meniscus regulators 15 and 16. The numeral 17 indicates ejection electrodes to which a voltage is applied to generate an electrostatic field at the ejection parts.

FIG. 4 presents the main body 14 with the meniscus regulators 15 and 16 removed from the structure shown in FIG. 3. The main body 14 has along its edge a plurality of ink channels 18 in which ink is circulated. Each ink channel is designed to exert capillarity enough to form a uniform ink flow, desirably having a width of 10 to 200 μm and a depth of 10 to 300 μm. On the surface of each channel 18 is provided an ejection electrode 17, which is formed, on the electrically insulating main body 14, using an electrically conductive material, such as aluminum, nickel, chromium, gold or platinum, in a known manner as in the above-described apparatus. The ejection electrode 17 may be formed on the entire inner surface or a part of the inner surface of the channel 18. The electrodes 18 are electrically independent from each other.

Two adjacent ink channels form one cell with a partition 19 provided in the middle. The tip (corner) of the partition 19 is made thinner than the other part to form an ejection part 20 or 20'. The tip of the ejection part may be cut off to be slightly rounded as shown by the ejection part 20'. The main body having the above structure can be made by well-known techniques, such as machining or etching a block of an insulating material or molding an insulating material. The ejection part 20 or 20' preferably has a thickness of 5 to 100 μm, and the ejection part 20 preferably has a radius of curvature of 5 to 50 μm. A plurality of cells (only two of them are shown in FIG. 4) are partitioned by their respective partitioning walls 21. The corner 22 of every partitioning wall 21 is cut off so that the ejection parts 20 or 20' may project over the corners 22 of the partitioning walls 21. Ink fed from an ink feeding means (not shown) flows in the direction I through the ink channels to the ejection parts.

Excess ink is made to run in the direction a by an ink recovery means (not shown) so that the ejection parts can always be supplied with fresh ink. While not illustrated, an opposite electrode is provided to face the ejection parts, and a recording medium is held thereon. While irradiating the ink with light as shown by symbol L, a signal voltage according to image data is applied to the ejection electrodes, to thereby eject the ink from the ejection parts 20 or 20' to form an image on the recording medium. The same irradiation means as described for the aforementioned apparatus can be used in this embodiment.

Figure 5:
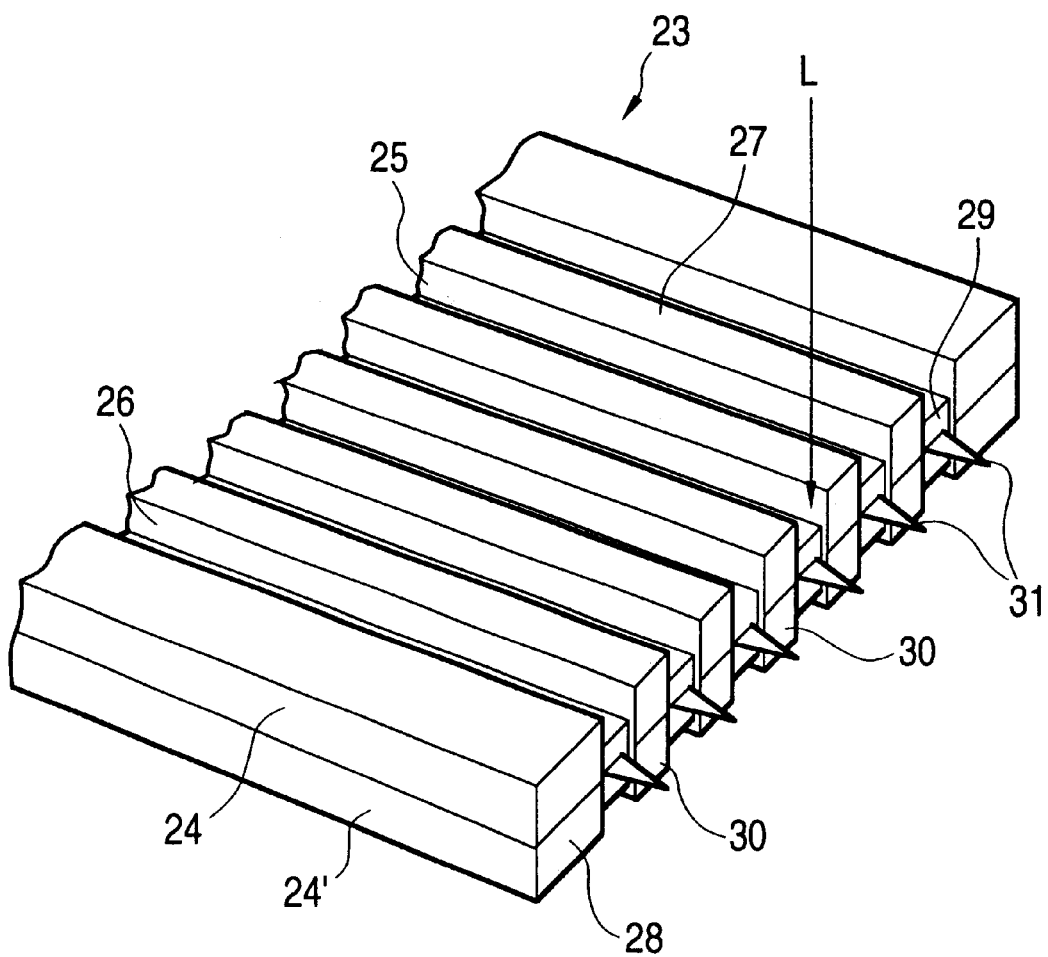
FIG. 5 is a schematic perspective view of a still other embodiment of a head for use in the invention.

A still other embodiment of the recording head useful in the invention is shown in FIG. 5. The head 23 shown has a pair of insulating rectangular plates of 1 to 10 mm in thickness made of plastics, ceramics, glass, etc. as supporting members 24 and 24'. Each of the supporting members 24 and 24' has formed on the outer side thereof a plurality of parallel ink channels 25 (on the side shown) and 25' (on the side not shown) at given intervals corresponding to a desired resolving power. Each channel preferably has a width of 10 to 200 μm and a depth of 10 to 300 μm. An ejection electrode 26 is formed on the entire inner side or a part of the inner side of each channel. The non-grooved parts of the supporting members 24 and 24' among the ink channels 25 and among the channels 25' serve as partitioning walls 27. The supporting members 24 and 24' are joined with their grooved surfaces outward in such a manner that the positions of the ink channels on one side agree with those on the other side, forming a plurality of pairs of ink channels connected via a rectangular portion 29 that is positioned at the end of each channel. That is, the head 23 has a plurality of channels through which ink can flow from one side to the other side. The position of the rectangular portions 29 is below the upper end 28 of the head 23 by a prescribed distance (generally from 50 to 500 μm). In other words, the upper end 30 of each partitioning wall 27 projects over each of the rectangular portions 29. A projecting guide 31 made of the above-described insulating material projects from each rectangular portion 29 to provide an ejection part.

Ink is fed to the rectangular portions 29 through the respective ink channels 25 on the supporting member 24 and returned through the respective channels 25' on the other supporting member 24'. To facilitate smooth ink circulation, the recording head 23 is tilted at a prescribed angle with the ink feed side (supporting member 24) upward and the ink return side (supporting member 24') downward. While circulating in this way, ink rises along each projecting guide 31 to form an ink meniscus around the rectangular portion 29 and the projecting guide 31. With an ink meniscus being formed independently on every rectangular portion 29, the ink in the vicinity of the ejection parts is irradiated with light L. By applying a signal voltage based on image information to the ejection electrode 26 with reference to an opposite electrode (not shown) on which a recording medium is held, the ink is ejected from the ejection part to form an image on the recording medium.

A cover can be provided on each of the supporting members 24 and 24' to form culverts through which ink is forced to run. In this case, there is no need to tilt the recording head 23.

The same irradiation means as described for the aforementioned embodiments can also be used in this embodiment.

The oily ink for use in the present invention is preferably a dispersion of a dispersoid, which comprises at least colored particles that are solid at ordinary room temperature, in a nonaqueous solvent having a specific electric resistance of $10^9$ Ωcm or higher and a specific dielectric constant of 3.5 or smaller. Preferred examples of the nonaqueous solvent having the above-mentioned properties include straight-chain or branched aliphatic hydrocarbons, alicyclic hydrocarbons or aromatic hydrocarbons, halogen-substituted derivatives of these hydrocarbons, and silicone fluid (or silicone oil).

Examples of the hydrocarbon solvents are hexane, heptane, octane, isooctane, decane, isodecane, decalin, nonane, dodecane, isododecane, cyclohexane, cyclooctane, cyclodecane, benzene, toluene, xylene, mesitylene, Isoper C, Isoper E, Isoper G, Isoper H, Isoper L (Isomer: trade name of Exxon Corp.), Shellsol 70, Shellsol 71 (shellsol: trade name of Shell Oil Co.), Amsco OMS, and Amsco 460 (Amsco: trade name of Spirits).

The halogen-substituted hydrocarbon solvents typically include fluorohydrocarbons, such as perfluoroalkanes represented by $C_nF_{2n+2}$, e.g., $C_7F_{16}$ and $C_nF_{2n+2}$ (e.g., Florinate PF5080 and Florinate PF5070, trade names of Sumitomo 3M Ltd.), fluorocarbons (e.g., Clitox GPL series, a trade name of Du Pont Japan Ltd.), flon compounds (e.g., FC-141b, a trade name of Daikin Industries, Ltd.), and iodofluorohydrocarbons (e.g., $F(CF_2)_4CH_2CH_2I$ or $F(CF_2)_6I$, available from Daikin Fine Chemical under trade names of I-1420 or I-1600).

The silicone oil includes dialkylpolysiloxanes (e.g., hexylmethyldisiloxane, tetramethyldisiloxane, octamethyltrisiloxane, hexamethyltrisiloxane, heptamethyltrisiloxane, decamethyltetrasiloxane, trifluoropropylheptamethyltrisiloxane, and diethyltetramethyldisoloxane), cyclic dialkylpolysiloxanes (e.g., hexamethylcyclotrisiloxane, octamethylcyclotetrasiloxane, tetramethylcyclotetrasiloxane, and tetra(trifluoropropyl)tetramethylcyclotetrasiloxane), and methylphenylsilicone oil (e.g., KF56 and KF58, trade names of Shin-Etsu Silicone Co., Ltd.).

These solvents can be used either individually or as a mixture thereof.

The upper limit of the specific electric resistance and the lower limit of the specific dielectric constant of the nonaqueous solvent are about $10^{16}$ Ωcm and about 1.9, respectively. If the specific electric resistance is too low, the position of ink ejection is not stabilized, and the ink is liable to feather. If it is too high, a high voltage is required for ink ejection. Where the specific dielectric constant of the solvent is too high, the electric field is apt to be relaxed in the ink, tending to cause ink feathering. If it is too low, ink does not eject well.

Any pigments and dyes conventionally used in oily ink compositions, liquid developers for electrostatic electrophotography, or electrophotographic photoreceptors can be used as a colorant of the colored particles to be dispersed in the nonaqueous solvent. In particular, those for electrophotographic photoreceptors bring about satisfactory results.

Commonly employed pigments, either organic or inorganic, can be usedas the pigment for use in the present invention. Examples of useful pigments are azo pigments, phthalocyanine pigments, quinacridone pigments, isoindolinone pigments, dioxazine pigments, threne pigments, perylene pigments, perinone pigments, thioindigo pigments, quinophthalone pigments, metal complex pigments, and the like.

Suitable examples of the dye for use in the invention include oil colors, such as azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, and metallophthalocyanine dyes.

These pigments and dyes can be used either individually or as an appropriate combination thereof. They are preferably used in an amount of 0.01 to 5% by weight based on the total weight of the ink composition.

The colorant can be incorporated into dispersed resin particles or it may be directly dispersed in the nonaqueous solvent. Where combined with resin particles, pigments are generally used as coated with a resin material of dispersed resin particles, and dyes are generally used to color the surface of dispersed resin particles to provide colored particles. Where the colorant itself is directly dispersed in the nonaqueous solvent, the ink composition preferably further contains dispersed resin particles in an amount of 0.5 to 20% by weight based on the total weight of the ink composition in favor of fixability onto a recording medium.

The dispersed resin particles may be of any resin that is solid at or below 35° C. and is compatible with the nonaqueous solvent (hereinafter sometimes referred to as resin P). It is desirable for resin P to have a glass transition point (Tg) of −5° to 110° C. or a softening point of 33° to 140° C., particularly a Tg of 10 to 100° C. or a softening point of 38 to 120° C., especially a Tg of 15 to 80° C. or a softening point of 38 to 100° C. Use of resin P having the preferred Tg or softening point brings about improved adhesion between the image and a recording medium and, in particular, when applied to plate making, ensures marked improvement in press life.

Resin P preferably has a weight average molecular weight (Mw) of $1\times10^3$ to $1\times10^6$, particularly $5\times10^3$ to $8\times10^5$, especially $1\times10^4$ to $5\times10^5$.

Such resin P includes olefin homo- or copolymers, such as polyethylene, polypropylene, polyisobutylene, an ethylene-vinyl acetate copolymer, an ethylene-acrylate copolymer, an ethylene-methacrylate copolymer, and an ethylene-methacrylic acid copolymer; vinyl chloride homo- or copolymers, such as polyvinyl chloride and a vinyl chloride-vinyl acetate copolymer; vinylidene chloride copolymers, vinyl alkanoate homo- or copolymers, allyl alkanoate homo- or copolymers; homo- or copolymers of styrene or a derivative thereof, such as a butadiene-styrene copolymer, an isoprene-styrene copolymer, a styrene-methacrylate copolymer, and a styrene-acrylate copolymer; acrylonitrile copolymers, methacrylonitrile copolymers, alkyl vinyl ether copolymers, acrylic ester homo- or copolymers, methacrylic ester homo- or copolymers, itaconic diester homo- or copolymers, maleic anhydride copolymers, acrylamide copolymers, methacrylamide copolymers, phenol resins, alkyd resins, polycarbonate resins, ketone resins, polyester resins, silicone resins, amide resins, hydroxyl- and carboxyl-modified polyester resins, butyral resins, polyvinyl acetal resins, urethane resins, rosin resins, hydrogenated rosin resins, petroleum resins, hydrogenated petroleum resins, maleic acid resins, terpene resins, hydrogenated terpene resins, chroman-indene resins, cyclized rubber-methacrylic ester copolymers, cyclized rubber-acrylic ester copolymers, copolymers containing a heterocyclic ring having no nitrogen atom (e.g., a furan ring, a tetrahydrofuran ring, a thiophene resin, a dioxane ring, a dioxofuran ring, a lactone ring, a benzofuran ring, a benzothiophene ring or a 1,3-dioxetane ring), and epoxy resins.

The dispersed resin particles for use in the ink are prepared by well-known mechanical grinding methods or polymerization granulation methods. Mechanical grinding is carried out by a method comprising dry grinding resin particles or a melt-kneaded mixture of resin particles and a colorant in a known grinder and wet grinding the resulting grinds together with a dispersing polymer in a wet dispersing machine (e.g., a ball mill, a paint shaker, an keddy mill, a dynomill) or a method comprising dispersing colorant particles in the presence of a dispersing polymer. Techniques adopted to production of paints or electrophotographic liquid developer can be utilized. These techniques are described in detail in Ueki Kenji (translation supervisor), *Toryo no ryudo to ganryo bunsan*, Kyoritu Shuppan (1971), Solomon, *Toryo no kagaku, Paint and Surface Coating Theory and Practice*, Harasaki Yuji, *Coating kogaku*, Asakura Shoten (1971), and Harasaki Yuji, *Coating no kisokagaku*, Kozue Shoten (1977).

The colorant may be incorporated into resin particles prepared by polymerization granulation. Polymerization granulation can be carried out by well-known nonaqueous dispersion polymerization. For the details, reference can be made in Muroi Soichi (editorial supervisor), *Chobiryushi polymer no saishin gijutu*, Ch. 2, CMC Shuppan (1991), Nakamura Koichi (ed.), *Saikin no denshishashin genzo system to toner zairyo no kaihatsu jituyoka*, Ch. 3, Nihon Kagaku Joho (1985), K. E. J. Barrett, *Dispersion Polymerization in organic Media*, John Wiley (1975).

A dispersing polymer is usually used in combination to stabilize the dispersed particles in the nonaqueous solvent. The dispersing polymer mainly comprises a repeating unit soluble in a nonaqueous solvent and preferably has a weight average molecular weight (Mw) of $1\times10^3$ to $1\times10^6$, particularly $5\times10^3$ to $5\times10^5$.

Preferred soluble repeating units of the dispersing polymer include a polymer component represented by formula (I):

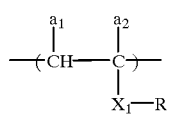

In formula (I), $X_1$ represents —COO—, —OCO— or —O—, and R represents an alkyl or alkenyl group having 10 to 32 carbon atoms, preferably 10 to 22 carbon atoms; and $a_1$, and $a_2$, which may be the same or different, each represent a hydrogen atom or a substituent.

The alkyl or alkenyl group as represented by R may be either straight or branched and either substituted or unsubstituted, while an unsubstituted group is preferred. Specific examples of R are decyl, dodecyl, tridecyl, tetradecyl, hexadecyl, octadecyl, eicosanyl, docosanyl, decenyl, dodecenyl, tridecenyl, hexadecenyl, octadecenyl, and linolenyl groups.

$a_1$ and $a_2$ in formula (I) may be the same or different and each preferably represent a hydrogen atom, a halogen atom (e.g., chlorine or bromine), a cyano group, an alkyl group having 1 to 3 carbon atoms (e.g., methyl, ethyl or propyl), —COO—$Z_1$ or —$CH_2$COO—$Z_1$, wherein $Z_1$ represents a hydrogen atom or a substituted or unsubstituted hydrocarbon group having 22 or less carbon atoms (e.g., alkyl, alkenyl, aralkyl, alicyclic, or aryl group).

Preferred hydrocarbon groups represented by $Z_1$ include a substituted or unsubstituted alkyl group having 1 to 22 carbon atoms (e.g., methyl, ethyl, propyl, butyl, heptyl, hexyl, octyl, nonyl, decyl, dodecyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl or 3-bromopropyl group), a substituted or unsubstituted alkenyl group having 4 to 18 carbon atoms (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, or linolenyl group), a substituted or unsubstituted aralkyl group having 7 to 12 carbon atoms (e.g., benzyl, phenethyl, 3-phenylpropyl, naphthyllmethyl, 2-naphthylethyl, cyclobenzyl, bromobenzyl, methylbenzyl, ethylbenzyl, methoxybenzyl, dimethylbenzyl or dimethoxybenyl group), a substituted or unsubstituted alicyclic group having 5 to 8 carbon atoms (e.g., cyclohexyl, 2-cyclohexylethyl or 2-cyclopentylethyl group), and a substituted or unsubstituted aromatic group having 6 to 12 carbon atoms (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, or dodecyloylamidophenyl group).

The dispersing polymer can further comprise other repeating units as a copolymer component in addition to the repeating unit of formula (I). The copolymer component may be derived from any monomers copolymerizable with the monomer corresponding to the repeating unit of formula (I). The proportion of the repeating unit of formula (I) in the dispersing polymer is preferably 50% by weight or more, still preferably 60% by weight or more.

Specific examples of the dispersing polymer include dispersion stabilizing resin Q-1 used in the Examples described below and those commercially available (e.g., Solprene 1205, produced by Asahi Chemical Industry Co., Ltd.). Where the above-mentioned resin P is prepared by emulsion polymerization, the dispersing polymer is preferably added to the emulsion polymerization system beforehand. The dispersing polymer is suitably added in an amount of about 0.05 to 4% by weight based on the total weight of the ink composition.

The dispersed resin particles and colored particles (or colorant particles) in the oily ink may be positive or negative charge detectable particles. The particles can be endowed with charge detectability by appropriately employing the techniques known for wet developers used in the field of electrostatic electrophotography. For example, the charge-detecting agents and other additives described in *Saikin no denshishashin genzo system to toner zairyo no kaihatsu jituyoka* (supra), pp. 139–148, Denshi Shashin Gakkai (ed.), *Denshi shashin gijutsu no kiso to ohyo*, pp. 497–505, Coronasha (1988), and Harasaki Yuji, *Denshi shashin*, Vol. 16, No. 2, p. 44 (1977) can be used.

Useful charge-detecting agents include metallic soaps, organophosphoric acids or salts thereof, organosulfonic acids or salts thereof, and amphoteric surface active agents.

The metallic soaps include salts of fatty acids having 6 to 24 carbon atoms (e.g., 2-ethylhexynoic acid, 2-ethylcaproic acid, lauric acid, palmitic acid, elaidic acid, linolenic acid, linoleic acid, oleic acid, stearic acid, and enanthic acid), naphthenic acid, ethylenediaminetetraacetic acid, resin acids, dialkylsuccinic acids, alkylphthalic acids, alkylsalicylic acids, etc. with metals (e.g., Na, K, Li, B, Al, Ti, Ca, Pb, Mn, Co, Zn, Mg, Ce, Ag, Cd, Zr, Cu, Fe, and Ba). Specific examples of the metallic soaps are described in U.S. Pat. Nos. 3,411,936 and 3,900,412, JP-B-49-27707, JP-A-51-37651, JP-B-52-38937, JP-A-52-107837, and JP-A-53-123138.

The organophosphoric acids and salts thereof include mono-, di- or trialkylphosphoric acids having 3 to 18 carbon atoms in the alkyl moiety thereof and dialkyldithiophosphoric acids as described in British Patents 1411739 and 1276363.

The organosulfonic acids and salts thereof include long-chain aliphatic sulfonic acids, long-chain alkylbenzenesulfonic acids, dialkylsulfosuccinic acids, and their salts as described in JP-B-47-37128, JP-A-53-123138, JP-A-51-47437, JP-A-50-79640, and JP-A-53-30340.

The amphoteric surface active agents include phospholipids, such as lecithin and cephalin (JP-B-51-47046), β-alanine containing an alkyl group having 8 or more carbon atoms (JP-A-50-17642 and JP-A-49-17741), metal complexes of β-ketones (JP-B-49-27707), copolymers comprising a maleamic acid component (JP-B-6-19596 and JP-B-6-19595).

These charge-detecting agents can be used either individually or as a combination of two or more thereof.

The charge control agents as described above are suitably used in an amount of 0.001 to 1.0 part by weight per 1000 parts by weight of a dispersing medium (liquid carrier). The ink composition may further contain various additives as needed. The total amount of the additives is preferably regulated by the requirement as to the specific electric resistance of the ink. That is, the total amount of additives is preferably controlled so that ink components remaining after removing the dispersed particles from the oily ink composition have a specific electric resistance of $10^9$ Ωcm or higher. Otherwise, images of good quality are hardly obtainable.

While it has not yet been elucidated what mechanism enables formation of non-feathering dots of high resolution by a low signal voltage applied. It is assumed that the colored particles under irradiation are statically electrified or the charge of the irradiated colored particles is enhanced by carrier injection from the electrode in an electric field, and the colored particles electrophoretically migrate to the liquid surface and are concentrated there, followed by ejection. However, the invention is by no means limited by this assumed mechanism.

The invention will now be illustrated in greater detail by way of the following Examples, but the invention should not be construed as being limited thereto.

PREPARATION EXAMPLE 1

Preparation of Resin Particles PL-1:

A mixed solution of 10 g of resin Q-1 for dispersion stabilization having the structure shown below, 100 g of vinyl acetate, and 384 g of Isoper H was heated to 70° C. while stirring in a nitrogen stream. To the mixture was added 0.8 g of 2,2'-azobis(isovaleronitrile) as a polymerization initiator to allow the mixture to react for 3 hours. After 20 minutes from the addition of the initiator, white turbidity developed, and the reaction temperature rose to 88° C. An additional 0.5 g of the initiator was added, and the mixture was allowed to react further for an additional 2 hour period. The temperature was elevated up to 100° C., at which the mixture was stirred for 2 hours to evaporate unreacted vinyl acetate. After cooling, the reaction mixture was filtered through nylon cloth of 200 mesh. The white dispersion thus obtained found to be a monodisperse latex having a rate of polymerization of 90% and an average particle size of 0.23 $\mu$m. The particle size was measured with CAPA-500 manufactured by Horiba Seisakusho. Resin Q-1:

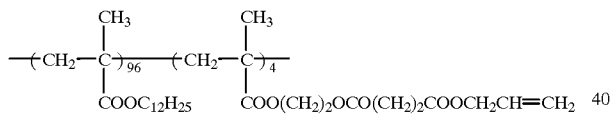

Mw=5×10$^4$

The figures mean weight ratio.

A portion of the white dispersion prepared was centrifuged at 1×10$^4$ rpm for 60 minutes. The separated resin particles were collected and dried. The resin particles had an Mw of 2×10$^5$ on polystyrene conversion as measured by gel-permeation chromatography and a Tg of 38° C.

Preparation of Oily Black Ink IK:

Ten grams of a dodecyl methacrylate/acrylic acid copolymer (95/5 by weight), 10 g of nigrosine, and 30 g of Shellsol 71 were dispersed in a paint shaker (Tokyo Seiki) together with glass beads for 4 hours to prepare a finely divided dispersion of nigrosine. A mixture of 6 g (on a solid basis) of the resin particles PL-1, 2.5 g of the nigrosine dispersion, 15 g of FOC-1400 (tetradecyl alcohol, produced by Nissan Chemical Industries, Ltd.), and 0.08 g of an octadecene/octadecyl maleamate copolymer was diluted with 1 1 of Isoper G to prepare oily black ink IK.

PREPARATION EXAMPLE 2

Preparation of Oily Color Ink IC, IM and IY:

Ten grams of a rosin ester-coated blue pigment (Microlith Blue 4GT, produced by Toyo Ink Mfg. Co., Ltd.), 10 g of Solprene 1205, and 80 g of Isoper H were dispersed in a paint shaker (Tokyo Seiki) together with glass beads for 6 hours to give a pigment dispersion having an average particle size of about 0.25 $\mu$m as measured with CAPA-500. The dispersion was 5-fold diluted with Isoper G to prepare cyan ink IC.

Magenta ink IM and yellow ink IY were prepared in the same manner as for cyan ink IC, except for replacing Microlith Blue 4GT with Microlith Red BR-T and Microlith Yellow 2G-5 (both produced by Toyo Ink Mgf.), respectively. The ink IM and IY had an average particle size of 0.23 $\mu$m and 0.27 $\mu$m, respectively.

EXAMPLE 1

The oily ink IK, IC, IM, and IY were charged in the respective ink tanks of an ink jet recording apparatus having four ink jet heads shown in FIGS. 1 and 2. Each of the heads had 30 ejection electrodes at a density of 100 dpi. The tip of each electrode had a width of 10 $\mu$m. The distance between the ejection electrodes and the opposite electrode was set at 1.0 mm. The ink on the ejection part was irradiated with light from a 100 W white light source (Cold Light HLS2100R, produced by HOYA Corp.) while applying a bias voltage, varying from 2 to 3 kV depending on the ink, between the ejection electrodes and the opposite electrode. In carrying out ink jet recording, the head was moved at a pitch of 600 dpi to perform interlacing image formation.

On applying a pulsated voltage of 375 V having a pulse width of 100 $\mu$sec based on image data, ink ejected from the ejection part. When an image was printed successively in four colors without involving a special drying operation, a high definition full color image free from feathering was formed on the recording medium held on the opposite electrode. The applied pulsated voltage is such that could be sufficiently controlled by an inexpensive FET, thereby contributing to reduction of the drive's cost. The recorded dots had a diameter of 40 $\mu$m. and the image density was 1.2 or more for each color.

COMPARATIVE EXAMPLE 1

Ink jet recording was carried out in the same manner as in Example 1, except that irradiation was not conducted. The ink did not eject unless the ejection voltage was raised to 900 V. When the gap between the ejection part and the recording medium was narrowed with the ejection voltage being fixed at 375 V, ink ejection was observed at a 250 $\mu$m gap, but during image formation dust entered the gap to cause image disturbances, resulting in a failure of stable image formation.

EXAMPLE 2

The oily black ink IK was charged in an ink jet recording apparatus having an ink jet head shown in FIGS. 3 and 4, and recording was carried out on a paper printing material having a hydrophilic image-receiving layer on its surface which was prepared as follows.

Preparation of Paper Printing Material:

Fine paper having a basis weight of 100 g/m$^2$ and having formed on both sides thereof a water-resistant layer mainly comprising kaolin, polyvinyl alcohol, an SBR latex, and a melamine resin was used as a substrate. Dispersion A prepared as follows was applied to a side of the substrate to a dry coating weight of 6 g/m$^2$ to form an image-receiving layer.

Formulation of Dispersion A:

| (1) | Gelatin (1st class, Wako Pure Chemical) | 3 g |
|---|---|---|
| (2) | Colloidal silica (Snowtex R-503, 20% aqueous solution, Nissan Chemical) | 20 g |
| (3) | Silica gel (Silicia #310, Fuji Silicia) | 7 g |
| (4) | Hardening agent | 0.4 g |
| (5) | Distilled water | 100 g |

The components (1) to (5) were dispersed in a paint shaker for 10 minutes together with glass beads.

The recording head had 256 ejection electrodes at a density of 150 dpi. The tip of the ejection part had a width of 10 µm and a curvature radius of 10 µm. The distance between the ejection electrodes and the opposite electrode was set at 1.0 mm. With a bias voltage of 2 kV being applied between the ejection electrodes and the opposite electrode, a 10 mW LED array (wavelength: 680 nm) placed near the ejection part was made to emit light from the entire surface to irradiate the ink on the ejection parts. A voltage of 350 V was applied to the ejection electrodes in accordance with image data having been processed by color separation. The pulse width of the applied ejection voltage was varied from 50 to 150 µsec in 256 steps, and image formation was performed in 256 steps per dot at a dot density of 600 dpi.

As a result, a feathering-free high definition image were formed on the plate material, the image made up of dots having a diameter varying from 15 to 60 µm in conformity to the pulse width. Under SEM observation, the dots were about 1.4 µm thick. After the image was fixed by hot air in a drier, offset printing was carried out on a printing machine Hamada VS34A (Hamada Insatsu Kikai) using the resulting printing plate. The resulting prints, even after continuously obtaining 3,000 copies, showed an extremely clear image with no dot missing nor scratches.

While the invention has been described in detail and with reference to specific examples thereof, it will be apparent to one skilled in the art that various changes and modifications can be made therein without departing from the spirit and scope thereof.

What is claimed is:

1. An ink jet recording method comprising:
   supplying insulating oily ink to an ejection part disposed so as to face a recording medium;
   irradiating the ink at said ejection part with light;
   applying an electrostatic field to the ink at said ejection part under irradiation in accordance with image data so as to eject the ink to form an image on the recording medium; and
   recovering excess ink from said ejection part.

2. The ink jet recording method according to claim 1, wherein said insulating oily ink comprises:
   a nonaqueous solvent having a specific electric resistance of not lower than $10^9$ Ωcm and a specific dielectric constant of not higher than 3.5; and
   a dispersoid dispersed in said nonaqueous solvent, which comprises at least colored particles that are solid at ordinary room temperature.

3. The ink jet recording method according to claim 1, wherein said irradiating light involves a wavelength that is absorbed by said ink.

4. An ink jet recording apparatus comprising:
   at least one feed for supplying insulating oily ink to an ejection part disposed so as to face a recording medium;
   an irradiating unit which irradiates the ink at said ejection part with light;
   an electrostatic field generator which generates an electrostatic field in accordance with image data and applies it to the ink at said ejection part under irradiation so as to eject the ink to form an image on the recording medium; and
   an ink return channel for recovering excess ink from said ejection part.

5. The ink jet recording apparatus according to claim 4, wherein said insulating oily ink comprises:
   a nonaqueous solvent having a specific electric resistance of not lower than $10^9$ Ωcm and a specific dielectric constant of not higher than 3.5; and
   a dispersoid dispersed in said nonaqueous solvent, which comprises at least colored particles that are solid at ordinary room temperature.

6. The ink jet recording apparatus according to claim 4, wherein said irradiating light involves a wavelength that is absorbed by said ink.

7. An ink jet recording apparatus comprising:
   means for supplying insulating oily ink to an ejection part which is disposed so as to face a recording medium;
   means for irradiating the ink at said ejection part with light;
   means for generating an electrostatic field at said ejection part under irradiation in accordance with image data so as to eject the ink to form an image on the recording medium; and
   means for recovering excess ink from said ejection part.

* * * * *